(12) United States Patent
Shigeta (10) Patent No.: US 11,183,006 B2
(45) Date of Patent: *Nov. 23, 2021

(54) TABLE GAME MANAGEMENT SYSTEM AND GAME TOKEN

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,346

(22) Filed: Jul. 9, 2019

(65) Prior Publication Data

US 2019/0347894 A1 Nov. 14, 2019

Related U.S. Application Data

(63) Continuation of application No. 15/785,788, filed on Oct. 17, 2017, now Pat. No. 10,398,202, which is a (Continued)

(30) Foreign Application Priority Data

Nov. 19, 2015 (JP) .................................. 2015-240631

(51) Int. Cl.
*G07F 17/32* (2006.01)
*A63F 3/00* (2006.01)
(Continued)

(52) U.S. Cl.
CPC ............ *G07F 17/322* (2013.01); *A44C 21/00* (2013.01); *A63F 1/14* (2013.01); *A63F 1/18* (2013.01);
(Continued)

(58) Field of Classification Search
CPC .... A63F 9/24; A63F 1/18; A63F 2003/00164; A63F 2009/2419; A63F 2011/0006;
(Continued)

(56) References Cited

U.S. PATENT DOCUMENTS 3,968,582 A  7/1976 Jones
4,026,309 A  5/1977 Howard
(Continued)

FOREIGN PATENT DOCUMENTS

JP  S64-500243 A  2/1989
JP  03-102917 U1  10/1991
(Continued)

OTHER PUBLICATIONS

Chinese Office Action dated Mar. 4, 2020 issued in corresponding CN Application 201680022511.0 cites the patent document above.
(Continued)

*Primary Examiner* — Malina D. Blaise
(74) *Attorney, Agent, or Firm* — Norton Rose Fulbright US LLP (57) ABSTRACT

A detection system according to the present invention includes a control device that detects fraud conducted on a game table by using the image analysis result obtained by an image analysis device. In addition, each game token used in this detection system has a multilayer structure having plastic layers with a plurality of different colors stacked on each other, with a colored layer being provided at least intermediately, and white layers or light-colored layers (not illustrated, but may be any layers lighter in color than the colored layer) being stacked on two sides of the intermediate colored layer. As described above, this game token has a multi-layer structure including the colored layer, with the white layers or light-colored layers (not illustrated, but may
(Continued)

be any layers lighter in color than the colored layer) being stacked on the two sides of the intermediate colored layer.

36 Claims, 8 Drawing Sheets

Related U.S. Application Data continuation of application No. PCT/JP2016/084180, filed on Nov. 17, 2016.

(51) Int. Cl.

| A44C 21/00 | (2006.01) |
|---|---|
| A63F 1/14 | (2006.01) |
| A63F 1/18 | (2006.01) |
| A63F 11/00 | (2006.01) |
| B42D 25/382 | (2014.01) |
| G06K 19/04 | (2006.01) |
| A63F 9/24 | (2006.01) |

(52) U.S. Cl.
CPC ...... *A63F 3/00157* (2013.01); *A63F 11/0002* (2013.01); *B42D 25/382* (2014.10); *G06K 19/047* (2013.01); *G07F 17/32* (2013.01); *G07F 17/3241* (2013.01); *G07F 17/3248* (2013.01); *A63F 2003/00164* (2013.01); *A63F 2009/2419* (2013.01); *A63F 2009/2489* (2013.01); *A63F 2011/0006* (2013.01); *A63F 2250/58* (2013.01); *G07F 17/3293* (2013.01)

(58) Field of Classification Search
CPC ......... A63F 3/00157; A63F 2009/2489; G07F 17/32; G07F 17/3241
See application file for complete search history.

(56) References Cited

U.S. PATENT DOCUMENTS

| 4,814,589 | A * | 3/1989 | Storch | G06K 7/1473 |
| | | | | 235/375 |
| 5,361,885 | A * | 11/1994 | Modler | A44C 21/00 |
| | | | | 194/214 |
| 5,651,548 | A | 7/1997 | French et al. | |
| 5,673,503 | A | 10/1997 | Redleman | |
| 5,757,876 | A | 5/1998 | Dam et al. | |
| 5,794,532 | A | 6/1998 | Gassies et al. | |
| 5,781,647 | A | 7/1998 | Fishbine et al. | |
| 5,941,769 | A | 8/1999 | Order | |
| 6,514,374 | B1 | 2/2003 | Zurawski et al. | |
| 6,532,297 | B1 * | 3/2003 | Lindquist | G07D 9/04 |
| | | | | 101/493 |
| 7,771,272 | B2 | 8/2010 | Soltys et al. | |
| 8,016,665 | B2 | 9/2011 | Gururajan et al. | |
| 2002/0024439 | A1* | 2/2002 | Kawai | G06K 19/07745 |
| | | | | 340/572.1 |
| 2002/0042298 | A1* | 4/2002 | Soltys | G07F 17/3251 |
| | | | | 463/29 |
| 2002/0167446 | A1* | 11/2002 | Goto | H01Q 1/38 |
| | | | | 343/700 MS |
| 2003/0220136 | A1 | 11/2003 | Soltys et al. | |
| 2004/0219975 | A1 | 11/2004 | Soltys et al. | |
| 2005/0012270 | A1 | 1/2005 | Schubert et al. | |
| 2005/0026680 | A1* | 2/2005 | Gururajan | A63F 1/14 |
| | | | | 463/25 |
| 2005/0051965 | A1* | 3/2005 | Gururajan | A63F 3/00157 |
| | | | | 273/292 |
| 2005/0240871 | A1* | 10/2005 | Wilson | G06K 19/06009 |
| | | | | 715/700 |
| 2006/0019739 | A1* | 1/2006 | Soltys | G07F 17/32 |
| | | | | 463/25 |
| 2006/0160608 | A1 | 7/2006 | Hill et al. | |
| 2006/0199649 | A1* | 9/2006 | Soltys | G07F 17/3241 |
| | | | | 463/47 |
| 2006/0252233 | A1* | 11/2006 | Honma | H01L 21/67132 |
| | | | | 438/464 |
| 2006/0287068 | A1* | 12/2006 | Walker | G07F 17/3237 |
| | | | | 463/25 |
| 2007/0015583 | A1* | 1/2007 | Tran | G07F 17/3288 |
| | | | | 463/40 |
| 2007/0060311 | A1 | 3/2007 | Rowe et al. | |
| 2007/0111773 | A1* | 5/2007 | Gururajan | G07F 17/3234 |
| | | | | 463/11 |
| 2007/0184898 | A1* | 8/2007 | Miller | G07F 17/32 |
| | | | | 463/29 |
| 2008/0113783 | A1 | 5/2008 | Czyzewski et al. | |
| 2009/0075725 | A1* | 3/2009 | Koyama | G07F 17/32 |
| | | | | 463/25 |
| 2009/0115133 | A1* | 5/2009 | Kelly | A63F 13/52 |
| | | | | 273/274 |
| 2010/0029380 | A1* | 2/2010 | Rhoads | A63F 13/10 |
| | | | | 463/29 |
| 2010/0105486 | A1* | 4/2010 | Shigeta | G07F 17/3251 |
| | | | | 463/47 |
| 2010/0113118 | A1* | 5/2010 | Shigeta | G07F 17/3251 |
| | | | | 463/11 |
| 2010/0227672 | A1* | 9/2010 | Amour | G06Q 30/02 |
| | | | | 463/25 |
| 2011/0018715 | A1* | 1/2011 | Lee | G06K 19/047 |
| | | | | 340/572.7 |
| 2011/0052049 | A1* | 3/2011 | Rajaraman | G06T 7/90 |
| | | | | 382/165 |
| 2012/0252564 | A1 | 10/2012 | Moore et al. | |
| 2013/0316797 | A1* | 11/2013 | Gelinotte | G07F 17/3248 |
| | | | | 463/25 |
| 2014/0291399 | A1 | 10/2014 | Koayama | |
| 2014/0332595 | A1* | 11/2014 | Moreno | G07F 7/02 |
| | | | | 235/488 |
| 2014/0357361 | A1* | 12/2014 | Rajaraman | G07F 17/323 |
| | | | | 463/31 |
| 2015/0312517 | A1 | 10/2015 | Hoyt et al. | |
| 2017/0039807 | A1* | 2/2017 | Shigeta | A63F 3/00157 |
| 2018/0114406 | A1 | 4/2018 | Shigeta | |

FOREIGN PATENT DOCUMENTS

| JP | H06-134140 A | 5/1994 |
| JP | 2000-259796 A | 9/2000 |
| JP | 2002-007989 A | 1/2002 |
| JP | 2008-077140 A | 4/2008 |
| JP | 2009-066172 A | 4/2009 |
| JP | 2009-066173 A | 4/2009 |
| JP | 2011-067339 A | 4/2011 |
| JP | 2011-106899 A | 6/2011 |
| JP | 2013-198626 A | 10/2013 |
| JP | 2014-140576 A | 8/2014 |
| JP | 2014-203139 A | 10/2014 |
| SG | 11201709269 A | 12/2017 |
| WO | 03082420 A1 | 10/2003 |
| WO | 2003082420 A1 | 10/2003 |
| WO | 2004112923 A1 | 12/2004 |
| WO | 2005110564 A2 | 11/2005 |
| WO | 2014182306 A1 | 11/2014 |
| WO | 2015-107902 | 7/2015 |

OTHER PUBLICATIONS

Japanese Office Action dated Jul. 16, 2019 for Corresponding Japanese patent application No. 2016-236224.
European Search report dated Jun. 4, 2019 for EP patent application 16866414.2.
Korean Office Action dated Apr. 15, 2019 for KR patent application 10-2018-7014097.
Examination Report No. 1 dated Dec. 20, 2017 for Australian patent application 2016356234.
International Search Report (PCT/ISN210) dated Oct. 25, 2016 for corresponding PCT Application PCT/JP2016/072673 cites the foreign patent documents above.

(56) References Cited

OTHER PUBLICATIONS

International Search Report (PCT/ISN210) dated Oct. 25, 2016 for corresponding PCT Application PCT/JP2016/072360 cites the US and foreign patent documents above.
International Search Report (PCT/ISA/210) dated Feb. 7, 2017 for corresponding PCT Application PCT/JP2016/084179 cites the US and foreign patent documents above.
International Search Report (PCT/ISA210) dated Oct. 3, 2017 for corresponding PCT Application PCT/JP2017/025796 cites the US and foreign patent documents above.
International Search Report (PCT/ISA210) dated Oct. 10, 2017 for corresponding PCT Application PCT/JP2017/032692 cites the US and foreign patent documents above.
Search Report dated Sep. 13, 2018 for Singapore patent application 11201804189W.
Australian Examination Report No. 1 dated Feb. 12, 2021 issued in AU Application 2020205219 cites the patent document above.
Australian Examination Report No. 2 dated Nov. 30, 2020 issued in AU Application 2018250362 cites the patent document above.
Australian Examination Report No. 3 dated Dec. 16, 2020 issued in AU Application 2018250362 cites the patent document above.

* cited by examiner

TABLE GAME MANAGEMENT SYSTEM AND GAME TOKEN

CROSS-REFERENCE TO RELATED APPLICATIONS

This application is a continuation of U.S. application Ser. No. 15/785,788 filed Oct. 17, 2017, which is a continuation of International Application No. PCT/JP2016/084180 filed Nov. 17, 2016, which claims priority to JP Application No. 2015-240631 filed Nov. 19, 2015, the entire contents of each of which is specifically incorporated by reference herein without disclaimer.

TECHNICAL FIELD

The present invention relates to a table game management system in a game hall.

BACKGROUND ART

In game halls such as casinos, various attempts have been made to prevent dealers from mishandling game tokens (chips). Game halls are equipped with surveillance cameras for monitoring the mishandling of chips by dealers to, for example, determine mishandling and fraud in collecting game tokens and distributing game tokens as a reward contradicting win-loss results on the basis of images obtained from the surveillance cameras, thereby preventing mishandling and fraud.

On the other hand, there has been proposed a technique of grasping the number and total amount of bet game tokens by attaching an IC tag to each game token to grasp the amount of the game token.

The card game monitoring system disclosed in Patent Literature 1 is designed to determine whether the game tokens placed on a game table have been collected or distributed as a reward according to win-loss results, by image analysis of the movements of the game tokens, thereby monitoring the mishandling of chips by the dealer.

CITATION LIST

Patent Literature

Patent Literature 1: WO 2015/107902

SUMMARY OF INVENTION

Technical Problem

Figure 2:
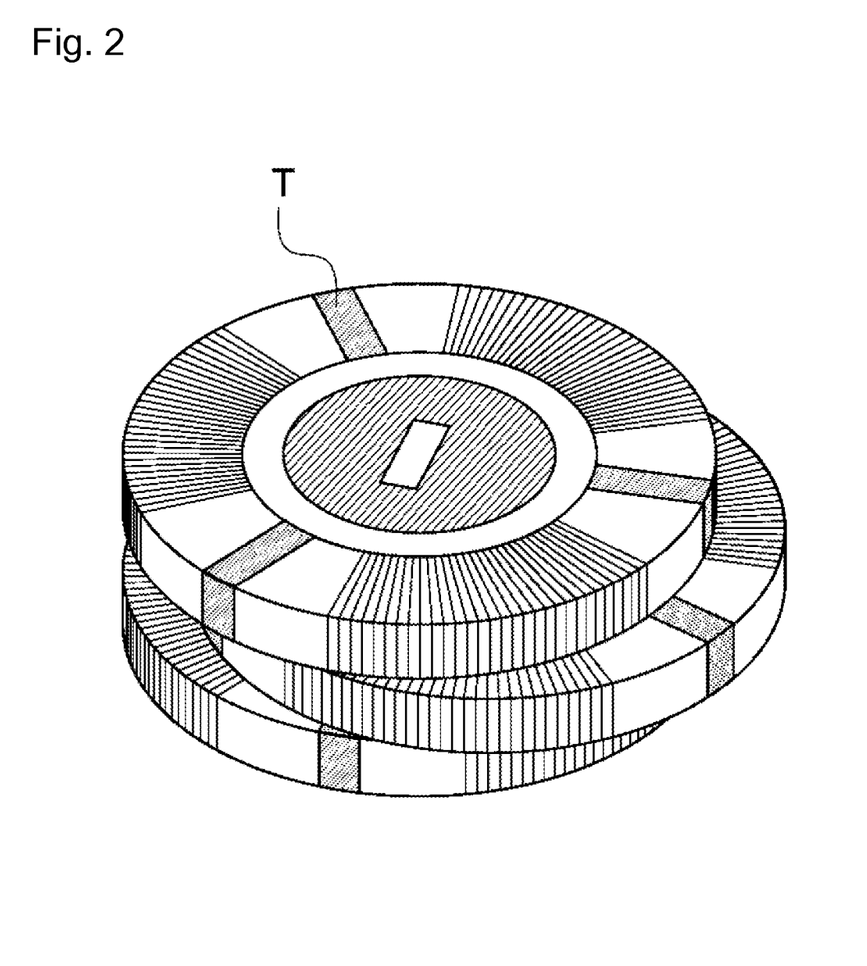
FIG. 2 is a perspective view of conventional game tokens.

In a game hall such as a casino, game tokens are stacked so high on a game table that the IC tag reader provided below the game table cannot correctly read the total amount of the tokens. Increasing the sensitivity of the reader will add together the amounts of game tokens placed at different positions (a win or loss depends on each position), thus leading to a failure to grasp the total amount of game tokens at each position. In addition, conventionally, as illustrated in FIG. 2, a game token (chip) T has a complex design. Stacking a large number of such chips makes it impossible to correctly grasp the number of stacked chips with a camera.

Furthermore, fraud on a game table is so sophisticated that it is not possible to find, for example, fraud made in a sophisticated way of betting by, for example, simply detecting that the amount won on a certain game table is large with a camera, thus posing a new problem.

Moreover, a dealer needs to collect game tokens and distribute game tokens as a reward placed on a game table according to win-loss results. Assume that this operation is determined by image analysis. In this case, because each game token (chip) has a complex design, it is not possible with any existing practical image analysis technique to determine whether the dealer has performed correct distribution for a reward when distributing chips as a reward corresponding to bet chips, thus resulting in the problem of insufficient prevention of mishandling.

Solution to Problem

In order to solve the various problems described above, a table game management system according to the present invention includes a card distributor that determines and displays a win-loss result on each game on a game table, a measurement device that measures types and number of game tokens placed on the game table, and a management control device that identifies and stores positions, types, and number of game tokens placed on the game table by a game participant by using a measurement result obtained by the measurement device in each game, wherein the game token has a multi-layer structure having plastic layers with a plurality of different colors stacked on each other, with a colored layer being provided at least intermediately, and white layers or light-colored layers being stacked on two sides of the intermediate colored layer, so as to be configured to form a striped pattern on a side surface in a stacking direction and allow identification of the type of game token according to the colored layer, and the management control device has a calculation function of determining participants in each game as a winner and a loser by using a win-loss result obtained from the card distributor and a measurement result on the positions, types, and number of game tokens placed by the game participants, and performing casino-side balance calculation on the game table for each game.

In addition, in the management system, the management control device is configured to have a function of determining the number of game tokens by measuring the number of colored layers, white layers, or light-colored layers of game tokens placed by each game participant.

In order to solve the various problems described above, a game token according to the present invention includes an arrangement having plastic layers with a plurality of different colors stacked on each other, with a colored layer being provided at least intermediately, and white layers or light-colored layers being stacked on two sides of the colored layer, so as to form a striped pattern on a side surface in a stacking direction and allow identification of the type of game token according to the colored layer.

In addition, the game token has a print indicating the type of game token provided on a surface of the white layer or the light-colored layer, and a transparent layer is provided on an outermost layer, with the layers being bonded to each other by thermal compression to form at least a five-layer structure.

Furthermore, the game token may be configured such that a mark formed by UV ink or carbon black ink is provided on a surface of the white layer or the light-colored layer, that the transparent layer on the outermost layer is embossed, that R chamfering is provided to an edge of the transparent layer on the outermost layer, that the colored layer includes a plurality of layers, or that the colored layer incorporates an RFID.

In order to solve the various problems described above, an inspection apparatus that inspects a game token according to the present invention includes a path including an inlet and an outlet through which a game token is allowed to pass in a radial direction, a chip type determination device that determines the color of a striped pattern on a side surface of a game token in a stacking direction by shooting the game token passing through the path, a mark reader that reads a mark formed by UV ink or carbon black ink and provided on a surface of a passing game token, a print inspection device that reads a print indicating a type, which is provided on a surface of a game token, from a direction perpendicular to the path, and a control device for the overall apparatus, wherein the control device is configured to inspect whether a chip type determined by the chip type determination device matches information of the print indicating the type obtained from the print inspection device.

Advantageous Effects of Invention

A system according to the present invention allows determination of the number of game tokens (chips) by image analysis even if a large number of chips are stacked on each other, and can grasp the total amount of game tokens stacked relatively high on the basis of the position and the colors.

DESCRIPTION OF EMBODIMENTS

Figure 1:
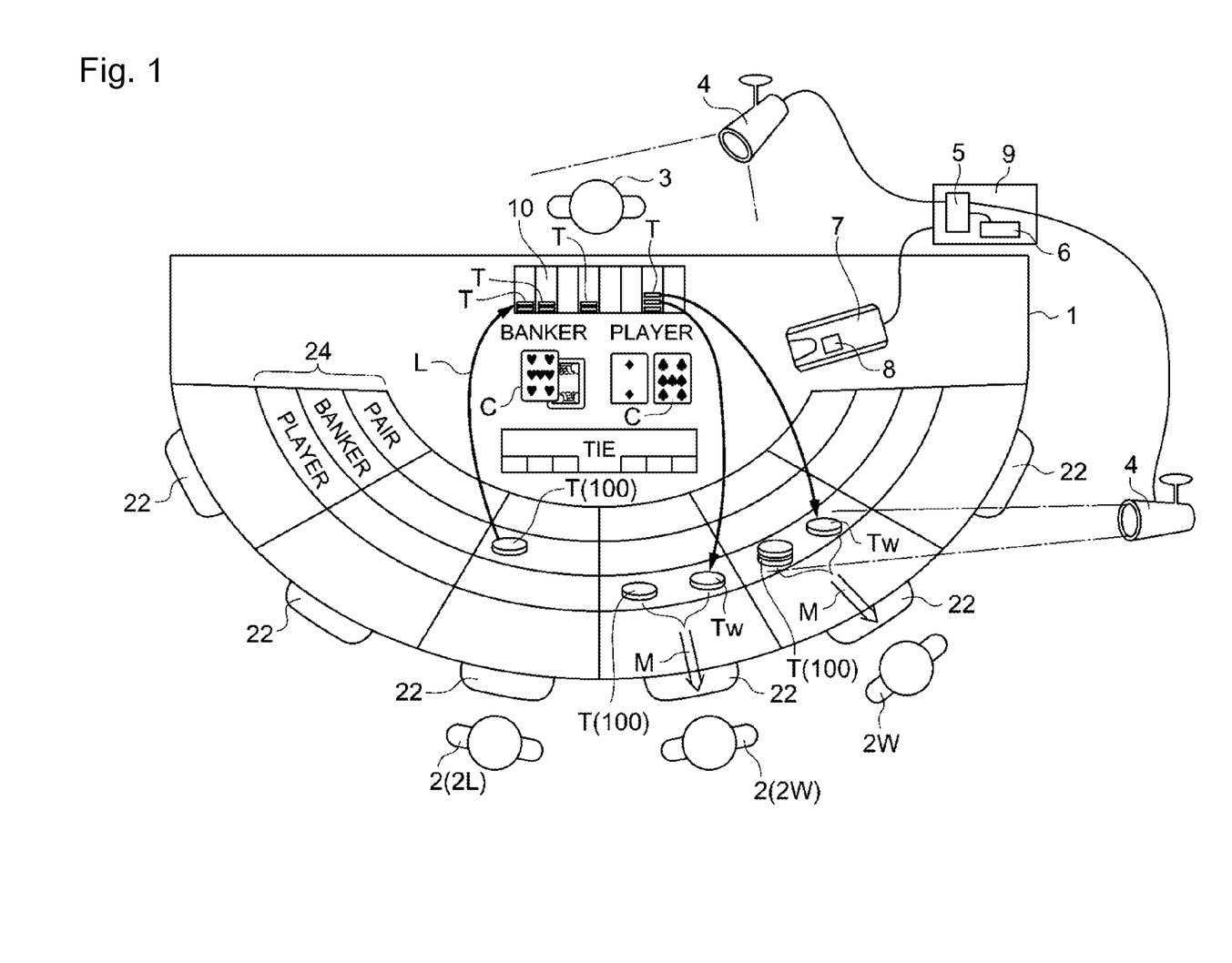
FIG. 1 is a plan view illustrating an outline of an overall table game management system in a game hall according to an embodiment of the present invention.

A table game management system in a game hall having game tables according to an embodiment of the present invention will be described below. FIG. 1 illustrates an overall outline of the system. The table game management system in a game hall having a plurality of game tables 1 includes a measurement device 6 including an image analysis device 5 that records the progress state of a game played on the game table 1, including game participants 2 and a dealer 3, as a video, via a plurality of cameras 4, and also performs image analysis on the recorded video of the progress state of the game, and a card distributor 7 that determines and displays win-loss results on each game on the game table 1. The card distributor 7 has been used and known by a person skilled in the art. The card distributor is a so-called electronic shoe, in which game rules are programmed in advance to determine a win or loss on the game by reading the information (rank and suite) of a distributed card C. In playing the Baccarat game, a banker's win, player's win, and tie (draw) are basically determined on the basis of the ranks of two or three cards, and a display lamp 8 displays the determination results (win-loss results).

A management control device 9 reads the information (rank and suite) of the card C obtained from the card distributor 7 and determines a win-loss result on each game. The management control device 9 also determines winners 2W and a loser 2L of the participants 2 in each game by using measurement results on the positions, types, and number of game tokens 100 (chips T) placed by the game participants 2. The management control device 9 also has a calculation function of calculating, for each game, a casino-side balance on the game table 1 (the amount obtained by subtracting the total amount of the game tokens 100 (chips T) distributed as a reward to the winners 2W of the participants 2 from the total amount of the game tokens 100 (chips T) bet by the loser 2L).

The image analysis device 5, the measurement device 6, and the management control device 9 in this detection system each have a composite structure including a computer, program, and memory in an integrated or discrete form.

Figure 3:
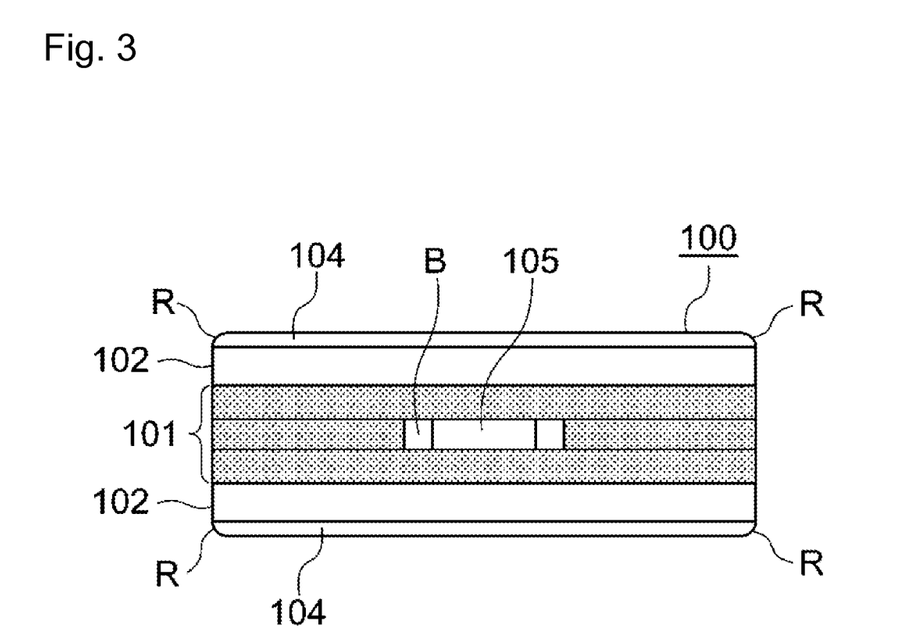
FIG. 3 is a front sectional view of a game token according to the embodiment of the present invention.
Figure 5A:
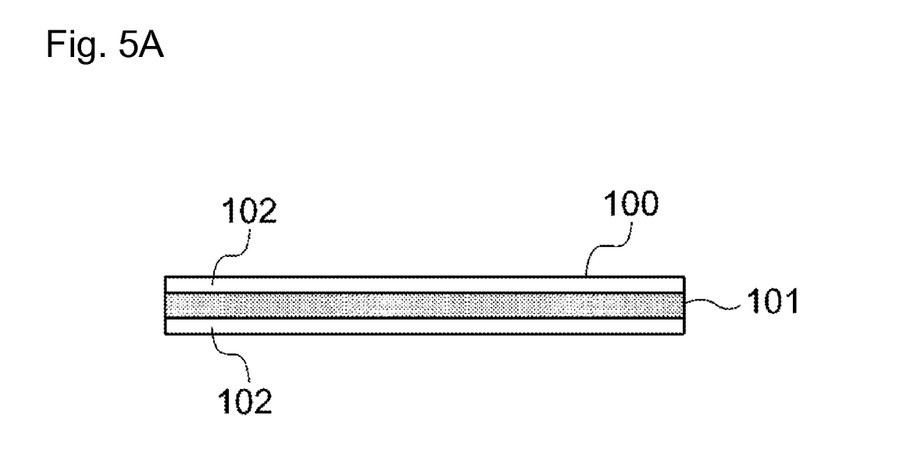
FIG. 5A is a front view of a game token according to the embodiment of the present invention.

A game token (chip) used in this detection system will be described in detail next. FIG. 3 is a front sectional view of the game token (chip T) 100 used in the detection system. This game token has a multi-layer structure having a plurality of plastic layers with a plurality of different colors stacked on each other. This multi-layer structure includes a colored layer 101 provided at least intermediately, with white layers 102 or light-colored layers (although not illustrated, any layers lighter in color than the colored layer 101) being stacked on the two sides of the colored layer 101. As described above, the game token includes the colored layer 101 and has the white layers 102 or light-colored layers (although not illustrated, any layers lighter in color than the colored layer 101) stacked on the two sides of the colored layer 101, thus forming a multi-layer structure. As illustrated in FIG. 5A, this forms a striped pattern on a side surface in the stacking direction. Changing the color of the colored layer 101 (to red, green, yellow, blue, or the like) makes it possible to identify the type of game token 100 (for example, 10 points, 20 points, 100 points, and 1000 points).

Figure 5B:
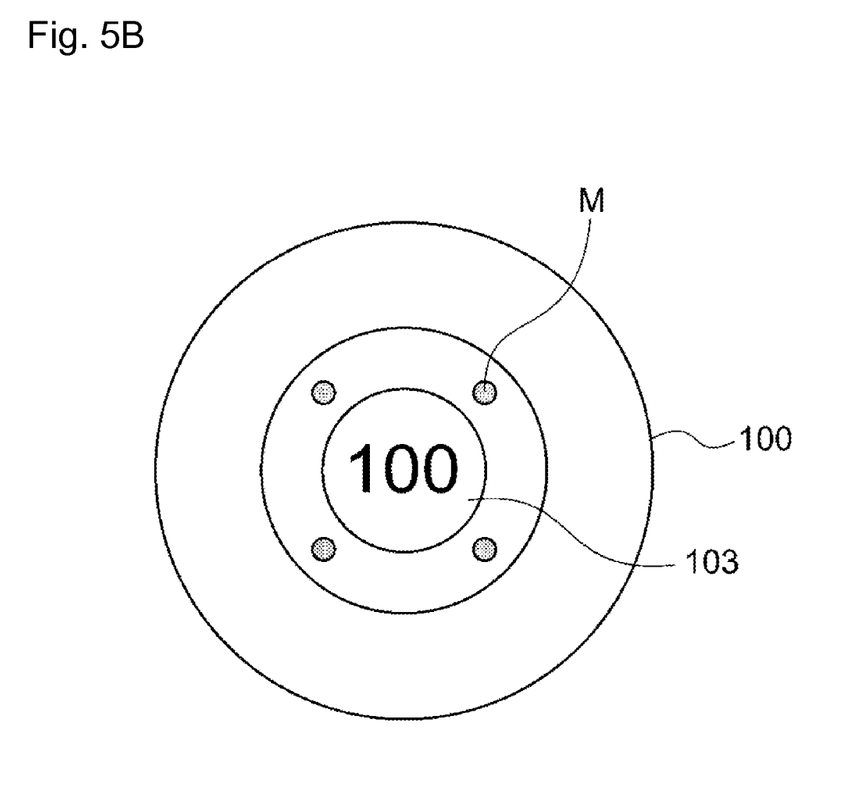
FIG. 5B is a plan view of a game token according to the embodiment of the present invention.

In addition, as illustrated in FIG. 5B, prints 103 (indicating 100 points or the like) indicating the type of game token 100 are formed on the surfaces (upper and lower surfaces) of the white layer 102 of the game token 100, and transparent layers 104 are provided on the outermost layers. The respective layers are bonded to each other by thermal compression to form at least a five-layer structure. Each game token 100 is formed by bonding the respective layers (the colored layer 101, the white layers 102, and the transparent layers 104), each formed from an elongated plastic material, by thermal compression into a tightly bonded structure (for example, a five-layer structure) and then punching it into, for example, a circular or rectangular shape using a press or like. When this structure is punched by a press, the dimensions of the die and punch used for punching are designed to provide R chamfering (round edges) to the edges of the transparent layers 104 on the outermost layers.

In addition, the surfaces of the white layer 102 of the game token 100 are provided with marks M printed by UV ink or carbon black ink. The marks M authenticate the game token 100. The marks M are visible when irradiated with ultraviolet light (or infrared light). A combination of the shape and number of such marks implements authentication. The transparent layers 104 are formed on the outermost layers by thermal compression bonding or a coating process (application) so as to cover the prints 103 and the marks M. The transparent layers 104 are embossed to prevent the game tokens 100 from clinging to each other.

The edges of the transparent layers 104 on the outermost layers, which are provided with the prints 103 (indicating 100 points or the like), are R-chamfered (R) to prevent the surfaces of the white layers 102 from being deformed and exposed from the side surface in a punching process for the game token 100. This also prevents the game token 100 from damaging the hands and other chips T with sharp edges that are left unchamfered.

As illustrated in FIG. 3, the colored layer 101 may be formed from a plurality of colored layers (three layers in FIG. 3). Because the plurality of colored layers (three layers in FIG. 3) are bonded to each other by thermal compression, the three-layer structure cannot be visually recognized unlike in FIG. 3. That is, FIG. 3 illustrates the three layers for the sake of descriptive convenience. In addition, a hollow portion B is provided in part of the intermediate layer of the three layers of the colored layer 101, and an RFID is embedded in the hollow portion.

The management control device 9 captures images of the game tokens 100 placed by the participants 2 in a game on the game table 1 by using the camera 4, and performs measurement for each area 24, on which the game tokens are placed, (to detect whether the participant has bet on the banker, player, pair ("PAIR"), or tie ("TIE")) by using the measurement device 6 including the image analysis device 5. In addition, the management control device 9 determines the types and number of game tokens 100 (chips T) stacked on each area by causing the measurement device 6 (using the information obtained by the image analysis device 5) to analytically measure the number and colors of the colored layers 101 (or light-colored layers) or the white layers 102 of the game tokens 100.

The management control device 9 may be a control device using artificial intelligence or having a deep learning structure. The management control device 9 can grasp, via the camera 4 and the image analysis device 5, the positions 24 (each position indicating whether the corresponding participant has bet on the player, banker, or pair), types (different amounts are assigned to the game tokens 100 for the respective colors), and numbers of game tokens T bet by the respective participants 2. A computer or control system using artificial intelligence and a deep learning (structure) technique can grasp the positions 24 (each position indicating whether the corresponding participant has bet on the player, banker, or pair), types (different amounts are assigned to the game tokens for the respective colors), and numbers of the game tokens T by using a self-learning function or the like. This allows the management control device 9 to determine, on the basis of analysis on each video indicating the progress state of each game via the image analysis device 5, whether the game token 100 bet by the participant 2L who has lost the game has been properly collected (indicated by an arrow L) and the game tokens 100 have been properly distributed as a reward to the participants 2W who have won the game in accordance with the win-loss results on the game determined by the card distributor 7.

Figure 4:
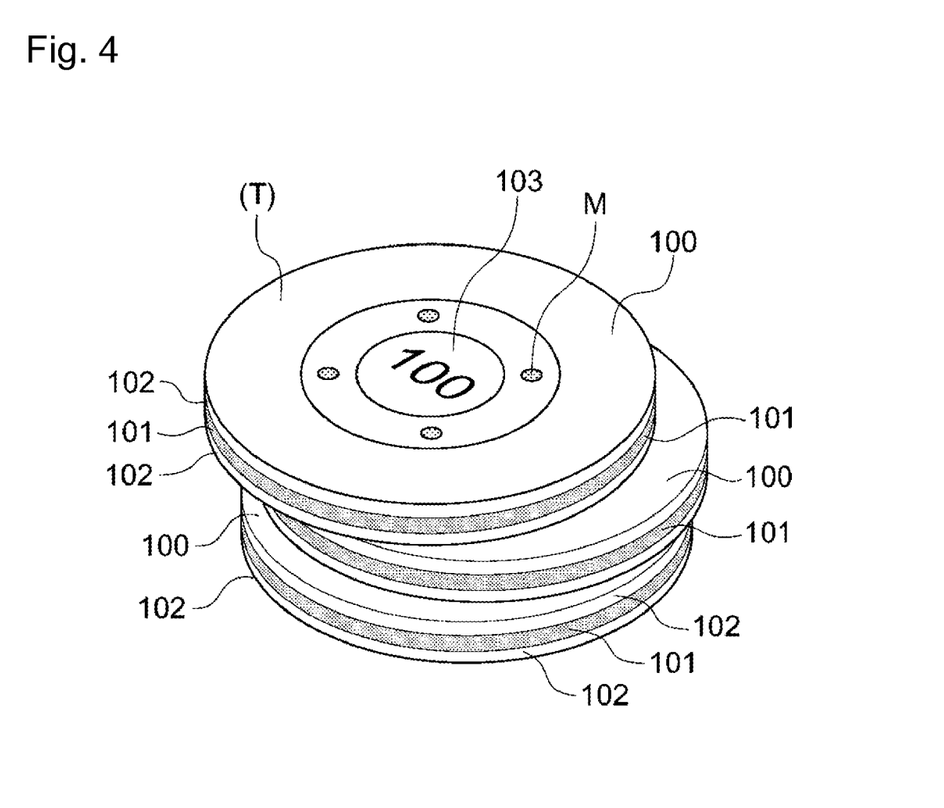
FIG. 4 is a perspective view illustrating a stacked state of game tokens which is grasped according to the embodiment of the present invention.

In such a case, as illustrated in FIG. 4, each chip has a multilayer structure having stacked layers (as compared with the conventional chip illustrated in FIG. 2), with a stripe pattern being sharply formed on the side surface in the stacking direction, and hence the measurement device 6 including the image analysis device 5 can easily and correctly measure the types and number of chips. In addition, using a computer or control system using artificial intelligence or a deep learning (structure) technique makes it possible to implement more correct image analysis and determination. Because the computer or control system using artificial intelligence and the deep learning (structure) technique have already been known by a person skilled in the art, and are available, a detailed description of them will be omitted.

The management control device 9 can analytically grasp the total amount of the game tokens Tin a game token tray 10 of the game table 1 which belongs to the dealer 3 by using the image analysis device 5. After balance settlement at the end of a given game, the management control device 9 can comparatively calculate, on the basis of win-loss results on the game, whether the total amount of the game tokens T in the game token tray 10 has increased or decreased, in accordance with the collection of the game tokens T bet by each participant 2 who has lost the game and a redemption amount TW of the game tokens bet by the game participants 2W who have won the game. Although the total amount of the game tokens Tin the game token tray 10 is always grasped by means such as RFIDs, the management control device 9 determines whether an increase or decrease in the total amount is correct, by analyzing a video representing the progress state of a game via the image analysis device 5. These operations may also be performed by using an artificial intelligence structure or deep learning structure.

The management control device 9 may have an artificial intelligence structure or deep learning structure that can grasp the position of a game token bet at each play position 22 on the game table 1 (each position indicating whether the corresponding participant has bet on the player, banker, or pair) and an amount (the types and number of game tokens), and can extract a peculiar situation (set by the casino) by comparing the win-loss history of each game participant 2 and the obtained amount of game tokens (winning amount) obtained from a win-loss result on each game with the statistical data of many past games (big data). Typically, the management control device 9 having such an artificial intelligence structure or deep learning structure can extract, as peculiar situations, a situation in which a winning amount has exceeded a certain amount (million dollars) and a situation in which the amounts of game tokens lost are small and the amounts of game tokens won are large at a given one of the positions 22 on the game table 1 over several consecutive games as compared with the statistical data (big data or the like) of past games.

The management control device 9 has a structure capable of comparatively calculating the total amount of the game tokens 100 in the game token tray 10 of the game table 1 which belongs to the dealer 3 so as to indicate, after balance settlement of the game tokens 100 bet by the respective participants 2 in each game, whether the calculated increase or decrease in the amount of game tokens corresponds to the balance settlement is correct. In the chip tray 10 for holding the game tokens 100 of the dealer 3 illustrated in FIG. 1, the types and number of game tokens 100 can be determined by causing the measurement device 6 (using the information obtained by the image analysis device 5) to analytically measure the number and colors of the colored layers 101 or white layers 102 of the game tokens 100 (chips T) stacked in the lateral direction. The total amount of the game tokens 100 in the chip tray 10 for holding chips is always (or at predetermined time intervals) grasped in this manner. The management control device 9 has a calculation function of performing, for each game, calculation of the settled amount of each game (casino-side balance calculation on the game table 1 (the amount obtained by subtracting the total amount of game tokens 100 (chips T) distributed as a reward to the winners 2W of the participants 2 from the total amount of game tokens 100 (chips T) bet by the loser 2L)). This makes it possible to always (or at predetermined time intervals) verify the total amount of the game tokens 100 in the game token tray 10. That is, it is verified whether an increase or decrease in the amount of game tokens matches the settled amount of each game on the basis of the image analysis result dealer 3 obtained by the image analysis device 5.

Figure 6:
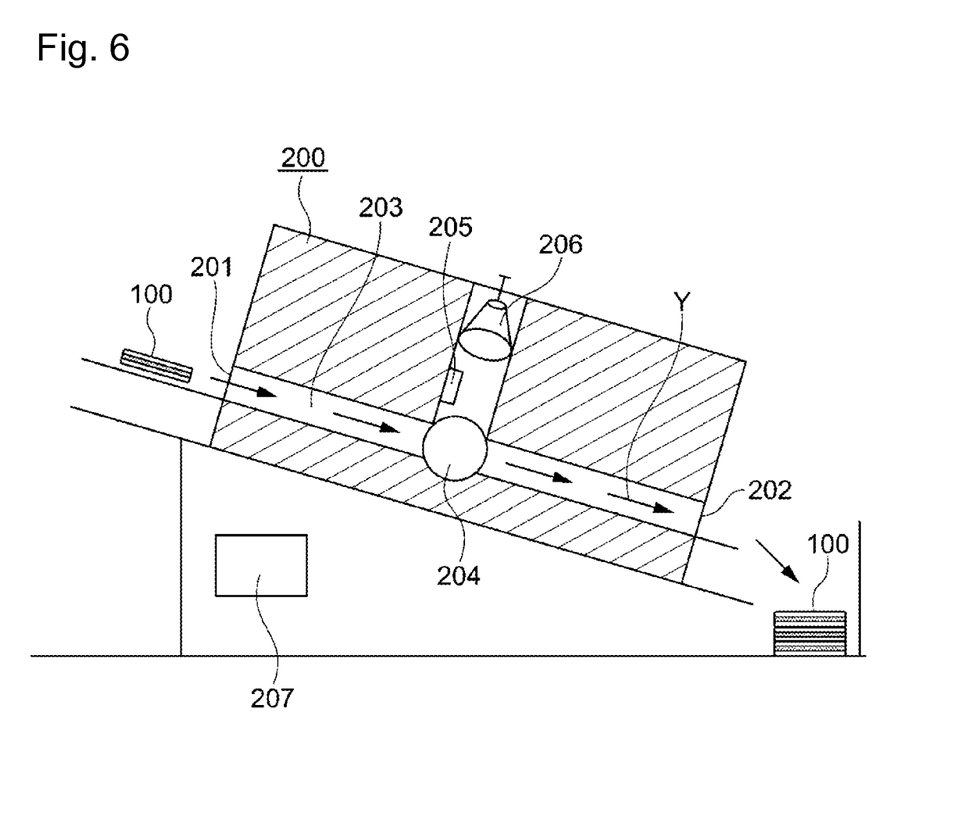
FIG. 6 is a side sectional view of an inspection apparatus for game tokens according to the embodiment of the present invention.
Figure 7:
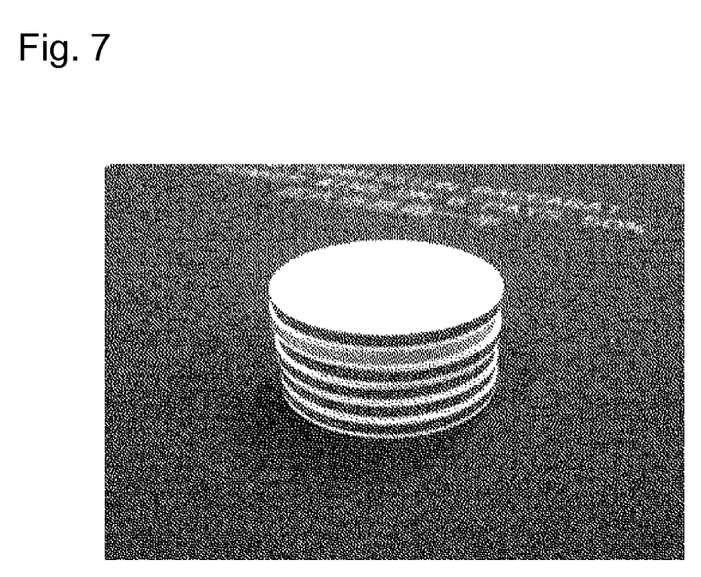
FIG. 7 is a perspective photographic view for explaining a stacked state of different types of game tokens according to the embodiment of the present invention.

An inspection apparatus 200 that inspects the game token 100 according to the embodiment of the present invention will be described next. The inspection apparatus 200 includes a path 203 having an inlet 201 and an outlet 202 through which the game token 100 can pass in the radial direction (the arrow Y direction). The path 203 is inclined, and the game token 100 passes through the path 203 in the arrow Y direction. The path 203 includes a chip type determination device 204 that determines the color of the striped pattern on the side surface of the game token 100 in the stacking direction by shooting the side surface, a mark reader 205 that reads the marks M printed by UV ink or carbon black ink and provided on the surface of the passing game token 100, a print inspection apparatus 206 that reads the print 103 provided on the surface of the game token from a direction perpendicular to the path 203, and a control device 207 for the overall apparatus. The control device 207 is configured to inspect whether the chip type determined by the chip type determination device 204 matches the information of the print representing a type, which is obtained from the print inspection apparatus 206.

The inspection apparatus 200 can inspect whether each print 103 on the manufactured game token 100 has been properly printed so as to match the chip type represented by the color of the striped pattern on the game token 100.

REFERENCE SIGNS LIST 1 game table
2 player
3 dealer
4 camera
5 image analysis device
6 measurement device
7 card distributor that determines and displays win-loss results on games
9 management control device
10 game token tray
100(T) game token
200 inspection apparatus

The invention claimed is:
1. A table game management system comprising:
a measurement device, wherein the measurement device is configured to sense features of game tokens placed on a game table and that each has a multilayer structure in appearance having (a) a colored layer and (b) white or light-colored layers, each layer of the multilayer structure being arranged alternately, thereby forming a striped pattern on a side surface of the respective game token in an axial stacking direction of the layers of the respective game token;
a win-loss result determining device; and
a management control device;
wherein, for each of one or more games played at the game table:

the win-loss determining device is configured to determine a respective win-loss result of the respective game; and
the management control device is configured to:
identify and store positions, types, and numbers of the game tokens placed on the game table respectively by each of one or more game participants for the respective game by using a measurement result obtained by the measurement device in the respective game, wherein, to identify the game tokens, the management control device is further configured to:
recognize respective ones of the colored layers of the game tokens placed on the game table as separate respective ones of the game tokens; and
for each recognized one of the game tokens, recognize a respective type of the game token based on a respective color of the colored layer, different ones of the game tokens being recognized as being different types based on the respective colors of their respective colored layers being different; and
perform a casino-side balance calculation associated with the game table for the respective game based on:
the respective win-loss result determined for the respective game; and
the positions, types, and number of game tokens identified, for the respective game, as having been placed by each of the one or more game participants.
2. A table game management system comprising:
a sensor configured to sense game tokens that are placed on a game table and that each has a multilayer structure in appearance, the multilayer structure including at least one white or light-colored layer and a colored layer that is darker than the at least one white or light-colored layer, thereby forming a striped pattern on a side surface of the respective game token in an axial stacking direction of the layers of the respective game token; and
at least one processor, wherein, for each of one or more games played at the game table, the at least one processor is configured to:
determine a win-loss result of the respective game;
identify respective positions, types, and numbers of the game tokens placed on the game table respectively by each of one or more game participants based on output of the sensor obtained by the at least one processor in the respective game, wherein, to identify the respective positions, types, and numbers of the game tokens, the at least one processor is further configured to, for each identified one of the game tokens, recognize a respective type of the game token based on a respective color of the colored layer of the respective game token, different ones of the game tokens being recognized as being different types based on the respective colors of their respective colored layers being different; and
perform a casino-side balance calculation associated with the game table for the respective game based on:
(a) the determined win-loss result of the respective game; and
(b) the positions, types, and numbers of game tokens identified for the respective game.

3. The table game management system according to claim 2, wherein the at least one processor that is includes a processor integrated in a card distributor and configured to determine the win-loss result of the respective game.

4. The table game management system according to claim 2, wherein, to determine the number of game tokens, the at least one processor is further configured to measure a number of colored layers or white or light-colored layers of the game tokens placed by each of the one or more game participants, and wherein the casino-side balance calculation on the game table for each game is configured to verify game token payouts based on the number and the type of the game tokens associated with a particular one of the one or more game participants and based on a determination associated with whether the particular participant was the winner or the loser.

5. The table game management system according to claim 2, further comprising a chip tray configured to hold the game tokens for each type, wherein the at least one processor is configured to:
measure types and numbers of game tokes on the chip tray to measure a total amount of the game tokens held by the chip tray; and
verify game token payouts from the chip tray based on the numbers and the types of game tokens held by the chip tray and the identified numbers and types of the game tokens on the game table.

6. The table game management system according to claim 2, wherein a surface of the white or light-colored layer includes a mark, the mark includes ultraviolet (UV) ink or carbon black ink.

7. The table game management system according to claim 2, wherein the colored layer comprises a plurality of adjoining colored layers.

8. The table game management system according to claim 2, wherein the colored layer incorporates a radio-frequency identification (RFID) tag.

9. The table game management system according to claim 2, wherein the at least one processor is configured to determine (a) a number of the colored layers, (b) a number of the white or light-colored layers, or a combination thereof, to determine the number of the game tokens.

10. The table game management system according to claim 2, wherein the at least one processor is configured to:
identify individual game tokens placed on the game table based on a corresponding striped pattern of each game token;
locate the colored layer of the identified individual game tokens based on the white or light-colored layers of the striped pattern; and
identify the type of color of the colored layer of each game token.

11. The table game management system according to claim 2, further comprising:
a chip tray configured to store a plurality of game tokens; and
a radio-frequency identification (RFID) reader proximate to the chip tray and configured to determine numbers and types of the plurality of game tokens stored by the chip tray based on RFID tags in the plurality of game tokens,
wherein the at least one processor is configured to verify game token payouts from the chip tray based on the numbers and the types of the game tokens stored by the chip tray determined and by the RFID reader, the numbers and the types of the game tokens on the game table determined based on the identified colored layers, and a determination associated with whether each participant in each game is a winner or a loser.

12. The table game management system according to claim 2, wherein each of the game tokens the at least one processor is configured to identify based on the colored layers of the game tokens comprises:
a first layer, which is a first transparent layer;
a second layer, which is a first of the white or light-colored layers and includes one or more marks, wherein the one or more marks comprises ultraviolet (UV) ink or carbon black ink;
a third layer, which is the colored layer, the colored layer defining a cavity and including radio-frequency identification (RFID) device positioned within the cavity;
a fourth layer, which is a second of the white or light-colored layers; and
a fifth layer, which is a second transparent layer,
wherein:
the second layer is positioned between the first and third layers,
the third layer is positioned between the second and fourth layers, and
the fourth layer is positioned between the third and fifth layers.

13. The table game management system according to claim 2, wherein the at least one processor is configured to identify the colored layer based on a contrast of the colored layer from its surrounding white or light-colored layers.

14. The table game management system according to claim 13, wherein the at least one processor is configured to determine the number of game tokens placed on the game table by counting a number of the colored layers of the game tokens.

15. The table game management system according to claim 2, wherein, for each of at least one of the game tokens whose colored layers the at least one processor is configured to identify, a print indicating the type of the respective game token is provided on a surface of the white or light-colored layer, and a transparent layer is provided as an outermost layer on each of the white or light-colored layers, with the layers being bonded to each other by thermal compression to form at least a five-layer structure.

16. The table game management system according to claim 15, wherein the transparent layer is embossed.

17. The table game management system according to claim 15, wherein R chamfering is provided to an edge of the transparent layer.

18. An inspection apparatus for inspection of a game token of a plurality of game tokens, the inspection apparatus comprising:
a path including an inlet and an outlet through which a game token is allowed to pass;
at least one sensor; and
at least one processor, wherein the at least one processor is configured to:
based on output of the at least one sensor:
determine a color of a striped pattern on a side surface of the game token in an axial stacking direction of the game token as the game token moves along the path, where the game token has a multilayer structure in appearance, the multilayer structure including at least one white or light-colored layer and a colored layer that is darker than the at least one white or light-colored layer, thereby forming a striped pattern on a side surface of the game token in a stacking direction of the layers of the game token, wherein the color is of the colored layer, the color of the colored layer differing between different ones of the plurality of game tokens; and read a print on a surface of the game token sensed from a direction perpendicular to the path as the game token moves along the path;

identify a type of the game token based on the determined color, which distinguishes the type from types of other ones of the plurality of game tokens whose respective colors of their respective colored layers differ from the determined color;

identify the type of the game token based on the read print; and determine whether the two identifications of the type of the game token match each other.

19. The inspection apparatus according to claim 18, wherein the path is inclined, and the at least one processor is further configured to inspect the print to ensure the print is proper.

20. The inspection apparatus according to claim 18, further comprising a mark reader that is configured to read a mark on the surface of the game token as the game token moves along the path to authenticate the game token, wherein the mark comprises an ultraviolet (UV) ink or carbon black ink.

21. A game token comprising a multilayer structure in appearance having (a) a colored layer and (b) white or light-colored layers that are arranged alternately with the colored layer, thereby forming a striped pattern on a side surface of the game token in a stacking direction of the layers of the game token, wherein a type of the game token is identifiable based on a color of the colored layer.

22. The game token according to claim 21, further comprising a transparent outermost layer of the game token, wherein a print indicating the type of game token is provided on a surface of the white layer or light-colored layer.

23. The game token according to claim 21, wherein a surface of the white or light-colored layer includes a mark comprising an ultraviolet (UV) ink or carbon black ink.

24. The game token according to claim 21, further comprising an embossed transparent outermost layer of the game token.

25. The game token according to claim 21, further comprising an embossed transparent outermost layer of the game token, wherein an edge of the transparent layer is R chamfered.

26. The game token according to claim 21, wherein the colored layer comprises a plurality of layers.

27. The game token according to claim 21, further comprising a radio-frequency identification (RFID) device in the colored layer.

28. The game token according to claim 21, wherein the layers are layers.

29. The table game management system according to claim 1, wherein the measurement result obtained by the measurement device includes color information regarding (a) the colored layers, (b) the white or light-colored layers, or a combination thereof.

30. The table game management system according to claim 1, wherein the layers of the multilayer structure of the game tokens are layers.

31. The table game management system according to claim 2, further comprising a display, wherein the at least one processor is configured to display the respective win-loss result via the display.

32. The table game management system according to claim 31, wherein the display is integrated in a card distributor.

33. The table game management system according to claim 2, wherein the layers of the game tokens are layers.

34. The table game management system according to claim 2, wherein the multilayer structure is identical for a plurality of the game tokens except for the respective color of the colored layer, which differs between different ones of the game tokens that are of different types.

35. The table game management system according to claim 1, wherein the multilayer structure is identical for a plurality of the game tokens except for the respective color of the colored layer, which differs between different ones of the game tokens that are of different types.

36. The inspection apparatus of claim 18, wherein the multilayer structure is identical for a plurality of the game tokens except for the respective color of the colored layer, which differs between the different ones of the game tokens that are of the different types.

\* \* \* \* \*

UNITED STATES PATENT AND TRADEMARK OFFICE
CERTIFICATE OF CORRECTION

PATENT NO. : 11,183,006 B2
APPLICATION NO. : 16/506346
DATED : November 23, 2021
INVENTOR(S) : Shigeta Page 1 of 1

It is certified that error appears in the above-identified patent and that said Letters Patent is hereby corrected as shown below:

In the Claims

Claim 30, Column 12, Line 18: please add --plastic-- before layers.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*